United States Patent [19]

Quinlan

[11] Patent Number: 5,268,187
[45] Date of Patent: Dec. 7, 1993

[54] METHOD AND APPARATUS FOR PRODUCING THIN SHEETS OF STARCH CONTAINING FOOD MATERIAL

[75] Inventor: Michael J. Quinlan, Cronulla, Australia

[73] Assignee: M. J. Quinlan & Associates Pty Limited, Cronulla, Australia

[21] Appl. No.: 828,926

[22] PCT Filed: Aug. 2, 1990

[86] PCT No.: PCT/AU90/00328
§ 371 Date: Mar. 13, 1992
§ 102(e) Date: Mar. 13, 1992

[87] PCT Pub. No.: WO91/01643
PCT Pub. Date: Feb. 21, 1991

[51] Int. Cl.$^5$ .................. A21C 11/00; A21D 8/00
[52] U.S. Cl. .................. 426/496; 425/181; 425/367; 425/DIG. 235; 426/502; 426/503; 426/517
[58] Field of Search ............ 426/496, 502, 503, 517; 425/181, 335, 367, DIG. 235

[56] References Cited

U.S. PATENT DOCUMENTS

| | | | |
|---|---|---|---|
| 1,830,426 | 11/1931 | Crosland | 425/367 |
| 2,526,944 | 10/1950 | Grainger | 425/181 |
| 2,608,939 | 9/1952 | Naylor | 425/367 |
| 2,642,014 | 6/1953 | Crosland et al. | 425/DIG. 235 |

FOREIGN PATENT DOCUMENTS

| | | |
|---|---|---|
| 560685 | 4/1944 | United Kingdom . |
| 635015 | 3/1950 | United Kingdom . |
| 2031328 | 4/1980 | United Kingdom . |

Primary Examiner—George Yeung
Attorney, Agent, or Firm—Townsend and Townsend Khourie and Crew

[57] ABSTRACT

Apparatus for production of 0.1-3 mm uniformly thick farinaceous dough sheets, comprising rollers (52, 53, 54), wedge-like sealer (56), inlet (55) and outlet (58). Positive hydrostatic pressure is maintained by adjusting the gap between adjacent rollers and/or the rotational speed of the rollers. For production of 2 sheets of dough simultaneously, a pair of rollers with a wedge-like sealer between them may be put adjacent and below rollers (52, 53).

24 Claims, 2 Drawing Sheets

METHOD AND APPARATUS FOR PRODUCING THIN SHEETS OF STARCH CONTAINING FOOD MATERIAL

TECHNICAL FIELD

This invention concerns apparatus and a method for producing thin sheets of farinaceous material and food products produced from these sheets, such as snack foods, biscuits, crackers, breakfast foods, pastries, pasta, pita breads, and pet foods. The apparatus is a new type of continuous sheet extruder, or cooker-extruder for making these sheets. A hollow food product which may be produced using the apparatus, and which may totally encapsulate another food article such as a nut, also forms part of the invention.

BACKGROUND ART

International PCT Patent Application No. PCT/AU88/0064 (published as WO 88/06849) describes a method of producing a hollow, totally enclosed, and self supporting food article by the steps of forming a layered material by contiguously positioning two layers of starch and water containing sheets of food material, such that adjacent sheets do not stick together, then cutting the sheets and hereby causing sealing of the interface between adjacent layers continuously around their extremity, and then cooking the shaped food articles in a manner such that steam generated between the layers is of sufficient pressure to force the layers apart in the centre of the article, to create a void in the central area, while retaining contact between the food material sheets of the seal extremities. It would be useful to have a better way of producing the thin sheets required to make these novel food articles.

It has also been found that prior known methods conventionally used in the food industry for rolling a farinaceous dough into a thin sheet are not ideal. These previously known methods when used to produce thin sheets give low manufacturing productivity and product quality, as a result of difficulties that arise in forming a dough using a mixture containing little or no gluten, or if the farinaceous material does contain gluten then problems occur in rolling the sheet to a thickness of less than 1.5 mm because of the stretching and spring back characteristics of the gluten.

In prior art three roll sheeting machines commonly used in the food industry the back pressure in the central region between the rollers is maintained at a relatively low level, and overfeeding of material from the primary roller(s) is compensated for by the excess material being able to flow counter current through the primary roller gap which therefore must be set wide enough for this purpose. In another example of such prior art machines, at least one of the primary rollers is fluted so that excess material is returned back to the feed hopper in the recess of these flutes and by the rotation of the rollers. In some cases the material simply slips on the surface of the primary rollers.

Because only relatively low back pressure is generated in the central region by prior art three roller sheeters the diameters of the secondary rollers have to be such that the nip angle is sufficiently large to create enough drag forces on the material being processed to force it through the final gap between the rollers at the exit.

If rollers of such relatively large diameters are set close enough together to give a thin sheet of farinaceous material in a single pass it has been found that the torque required to drive the rollers become very high and for sheet thickness of less than 1.5 mm the motor power and the mechanical stresses set up are generally in excess of the normal design loads of commonly used sheeters.

For example, U.S. Pat. No. 4,752,493 describes the difficulties that are experienced in attempts to obtain a smooth thin sheet of uniform thickness by rolling a dough prepared from farinaceous materials. In addition, U.S. Pat. Nos. 4,873,093 and 4,834,996 state that starchy materials such as corn flour and potato flour when mixed with water do not from a workable dough that can be used to form sheets of material typically used in the bakery industry.

Other prior art, for example, the preparation of Pita bread and that described in U.S. Pat. Nos. 4,455,321, 4,752,493 and 4,873,093 describe processes for the production of hollow food articles but all of these proceed from a single layer instead on two layers, and/or use chemicals or yeast for leavening gases.

DISCLOSURE OF THE INVENTION

According to the present invention the problems inherent in the prior art are solved and a continuous thin sheet of starch containing food material can be produced by means of a new roller sheet extruding system whereby the moist starch containing material is introduced between the rollers and exits as a thin rolled sheet. Preferably, the moist material introduced into the rollers has been pre-prepared by means of high speed chopping and mixing blades, to form the material into small moist agglomerates which aid the sheeting process. A back pressure exerted by the roller arrangement also assists in producing a sheet of material with an improved physical structure. By this means, the complicated steaming and pre-sheeting steps required in the prior art are thus avoided.

MODES FOR CARRYING OUT THE INVENTION

In the present invention it is preferred that the raw material prior to sheeting is hydrated and agglomerated in a controlled way. When wetted the starch cells will absorb water and begin to swell. Depending on the degree of cell damage and free starch or amylose present a certain amount of agglomeration or clustering of starch cells will occur. By using high speed chopping and mixing blades, and controlling the total moisture added together with the hydration time, a particulate material consisting of moist agglomerates can be produced. With products containing gluten the dough mostly remains undeveloped and its tendency to spring back is reduced. However, for a large commercial scale plant, a continuous process is best, as this not only reduces the amount of handling but also provides a feed mixture to the sheeter of consistent age, degree of hydration, starch retrogration and sheet forming properties.

While the material in some cases can be developed into a soft pliable and plastic dough in the classical way prior to feeding to the sheeter extruder described in the present invention, it has been found that if the mixing and agglomeration process described above is used to prepare the mix the total moisture content can be kept below the point where the mixture and resulting dough sheet are sticky. In this way the dough does not adhere to the rollers and therefore the need for dusting materials necessarily used in the food industry to prevent dough sticking to rollers, conveyors and other processing equipment is eliminated. The lower moisture content at which a sheet can be formed using the present invention also reduces the subsequent drying or cooking times with savings in energy and equipment costs.

Another advantage of preparing a moist particulate material as described, is that because it is free flowing it will feed more uniformly to the first roller set aiding in the production of a more uniform sheet. As a consequence the diameters of the rollers of the sheeter extruder can be made significantly less than would otherwise be the case as the nip angle between the rollers necessary to ensure constant intake of material is reduced. In this way smaller physical plant sizes are possible for a nominated output capacity resulting in cost savings on the processing equipment.

Figure 1:
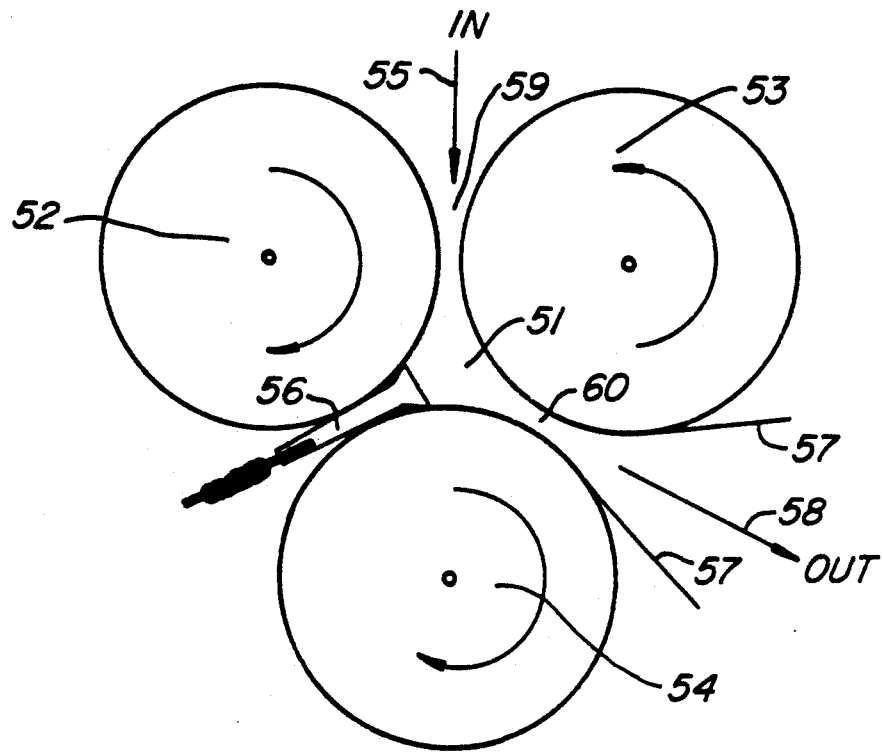
FIG. 1 shows a cross-sectional view of a three roller sheet extruder.

According to the present invention a continuous sheet of farinaceous material may be produced using a three roller system as shown in FIG. 1. In FIG. 1 the rollers are arranged such that there are two rollers 52 and 53 positioned above a roller 54. Raw material is allowed to enter via the top entrance 55. Rollers 52 and 53 and 54 rotate in the direction shown. One of the upper rollers rotates in the opposite direction to the other two rollers. The final sheet product leaves the rollers by exit 58. The rotation of the rollers and the gap setting 60 being less than the gap 59, causes back-pressure to build up within the central area 51. If the gap at 60 is set close to that at 59 low pressure is generated and if gap 60 is increased higher pressure is caused. Raw material is prevented from escaping through passage 56 by a wedge spring loaded back against rollers 52 and 54, and from escaping sideways by either having rotating retaining discs attached to the ends of one roller with a diameter as to cover the central void region or by side plates flush with the ends of the rollers. Scrapers 57 prevent the sheet returning around the rollers.

The gap between rollers 52 and 53 is set so that the pressure required to extrude farinaceous dough back from the central region 51 is greater than the pressure required to extrude the dough through the gap between rollers 53 and 54 which is lower because of the rotational direction of all rollers as shown. There is a positive hydrostatic pressure created in the central region greater than the surrounding external atmosphere and sufficient to cause the farinaceous material to form a cohesive matrix. The material in the central region 51 completely fills this region and behaves as a viscous liquid transmitting pressure equally in all directions.

In the roller design shown in FIG. 1 the roller gap settings and the back-pressure are adjusted to produce a sheet of starch containing food material with minimal starch cell damage and a suitable thickness. The arrangement of the rollers produces a controlled back-pressure which is exerted on the sheet material in the central region 51 between the three rollers as shown in FIG. 1. This can occur by spring tension, whereby the gap adjustment mechanism controlling gap 60 is such that if the back pressure in region 51 increases over the set spring tension the roller 53 will move slightly away from roller 54, which increases gap 60 and reduces the back pressure. Further control over the back pressure could be achieved by arranging for a variable and differential speed adjustment to rollers 52, 53 and 54. In this way, if the back pressure in the region 51 increases or decreases from a set value, the speed of one or two rollers is adjusted to reduce the feed of material 55 or increase the exit flow 58, or to do both. In practice spring tension control alone has been found to be effective and least costly.

Figure 2A:
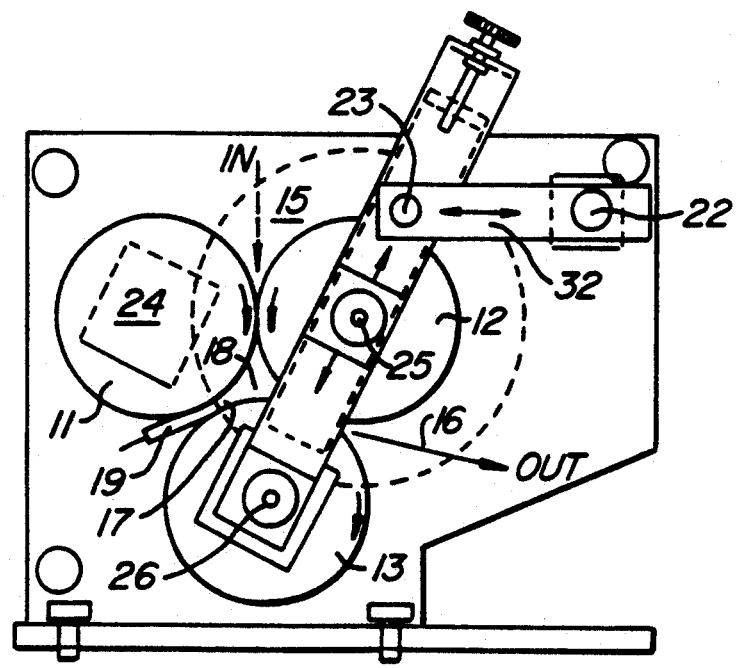
FIG. 2A shows a side view.
Figures 2B, 2C:
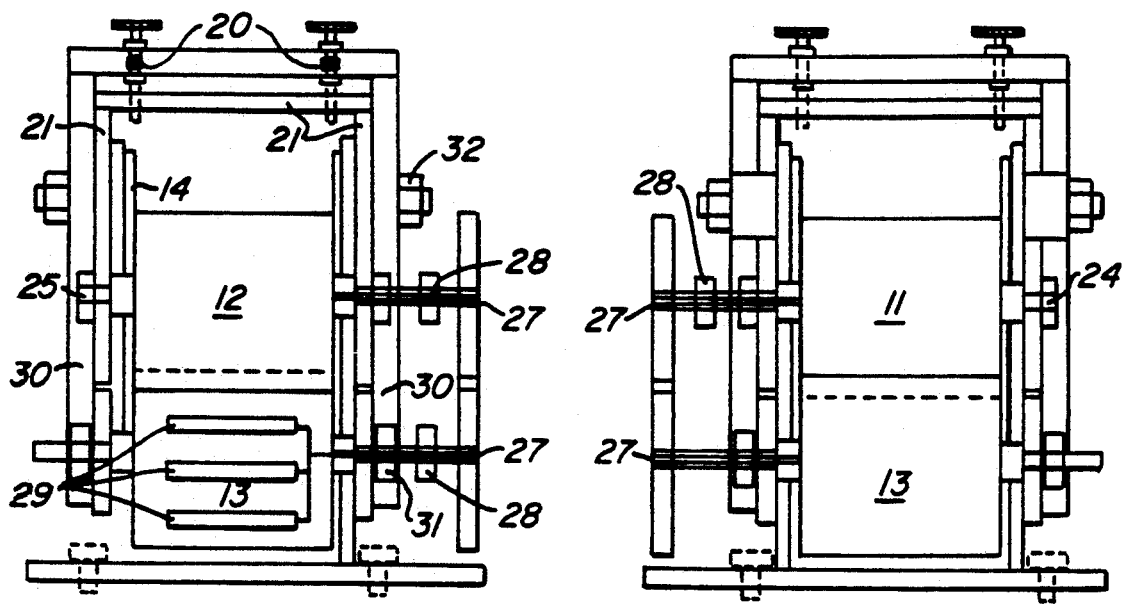
FIG. 2B shows a front view.
FIG. 2C shows a back view of the three roller sheet extruder/cooker.

In a further embodiment of the present invention, in FIGS. 2A, 2B and 2C, the rollers are arranged such that there are two rollers 11 and 12 positioned above roller 13. The rollers 11, 12, and 13 can be heated or cooled and maintained at a controlled temperature by some suitable heat exchange medium. In one example of the present invention FIGS. 2 show electrical heating elements 29 in appropriately machined recesses within rollers 11, 12, and 13 and connected to an external source of electric current by means of insulated wiring passing through a hollow channel 27 drilled through the roller shafts 24, 25 and 26 and attached to slip ring and brush sets 28 mounted on these shafts. Alternatively the rollers 11, 12 and 13 can be constructed from thick walled steel tubing with end plates fitted, thus forming a hollow region via channel 27 and connected to suitable couplings mounted on the shafts. It is also possible to heat the rollers 11, 12 and 13 directly by external flame or radiated heat. In another application of the present invention the rollers 11, 12 and 13 could be cooled rather than heated.

Further heating or cooling is achievable by utilizing heating or cooling elements positioned within the retaining wedge scraper 19 or by direct steam injection into the central region 18 via ports and channels machined into the wedge 19.

Another aspect of the present invention as shown in FIGS. 2A/B/C concerns the gap adjustment mechanisms. The bearing supporting shaft 25 is mounted on arm 21 which in turn can slide up or down in guides on arm 30. In this way gap 16 can be increased or decreased by adjusting an adjustment screw 20, or by other adjustment means. Roller 12 can also be pivoted by support arm 30 about shaft 26 by means of a bearing 31. Arm 30 is connected via pivot 23 to arm 32 which can be adjusted backward or forward by means of adjustment 22. In this way gap 15 may be increased or decreased. Beccause of the radial motion of roller 12 around roller 13 adjustments to gap 15 will not affect gap 16. Adjustment to gap 16 which is tangential to roller 11 will have a consequential effect on gap 15.

The design shown in FIG. 1 facilitates generation of a positive and controllable pressure in the central region 18 between the three rollers. This is achievable by using either a spring, hydraulic or pneumatic device at 20 (or a combination of these) whereby the gap adjustment arm 21 is able to be loaded such that if the back pressure in region 18 increases over the set tension, pressure roller 12 will move slightly away from roller 13, which consequently increases gap 16 and reduces the back pressure. If the pressure drops in region 18, roller 12 moves down to decrease gap 16 and the pressure in region 18 is maintained.

In FIGS. 2A/B/C further control over the back pressure can be achieved by variable and differential speed adjustment to rollers 11, 12 and 13. In his way, if the back pressure in the region 18 increases or decreases from a set value, the speed of one or two rollers in adjusted to increase or reduce the feed of material at 15 or the exit flow 16, or to do both. By selecting the appropriate gap settings for 15 and 16 together with the temperatures of the rollers 11, 12 and 13, and the speeds of these rollers and by adjusting the back pressure in the central region 18 it is possible to cause heat transfer rates, pressure and frictional heat generation and material flows sufficient to continuously heat and process the material. Also, due to the elevating effect of overpressure on the boiling point and the prevention of evaporative losses as a result of the material being totally constrained in region 18 it is possible to process material in this region at higher temperatures than would be possible at atmospheric pressure.

In the prior art, extruders are commonly used to continuously process materials. There are numerous examples of this to be found in the snack food, pasta, breakfast food, bakery, pet food and other related industries, in the form of short and long barrel extruders, the former in general relying on friction to generate heat and pressure, and the latter using external heating jackets as well. Similar extruder/cookers are also used in the pharmaceutical, confectionary, plastics and chemical process industries.

The apparatus of the present invention can be used as an improved method of manufacture for many kinds of products in these industries. For example, if a starch containing food material is cooked and sheeted according to the present invention the sheeted material can be cut, shaped and then fried or baked to produce a snack food or it could be dried after cutting and shaping to yield a snack food pellet. In another example, the sheeted material can be cut and dried to form a crisp bread. Furthermore, the sheeted material could be cut and dried to form a pasta product, e.g., pre-cooked lasagne sheets. There are many more similar applications which will be obvious to those skilled in the art.

The advantages of the present invention over the prior art extruders are many and include easier operation due to less complication in design and operating principles—for example, cleaning is simpler as all working parts are easier to get at compared to removing the auger or augers from an extruder.

Because of its simpler design, the sheeter cooker of the invention will generally be cheaper in construction and therefore its capital cost will be less than that of an extruder for the same capacity output.

A sheeter/cooker designed according to the present invention does not require expensive and sophisticated dies and change parts and also blockages and production downtime commonly experienced using static small dimensioned die orifices are eliminated.

Because of the relative simplicity of sheeter/cooker equipment, less skill, training and specialised knowledge are required of the operating personnel, and change over times in a production environment are also less. These factors make increased efficiency possible.

As a consequence of the difference in rheology of material being extruded through a fixed die compared to being sheeted through moving rollers, greater mass outputs are possible from a sheeter as compared to an extruder for a given power input, drive motor and physical mechanical size.

Figure 3:
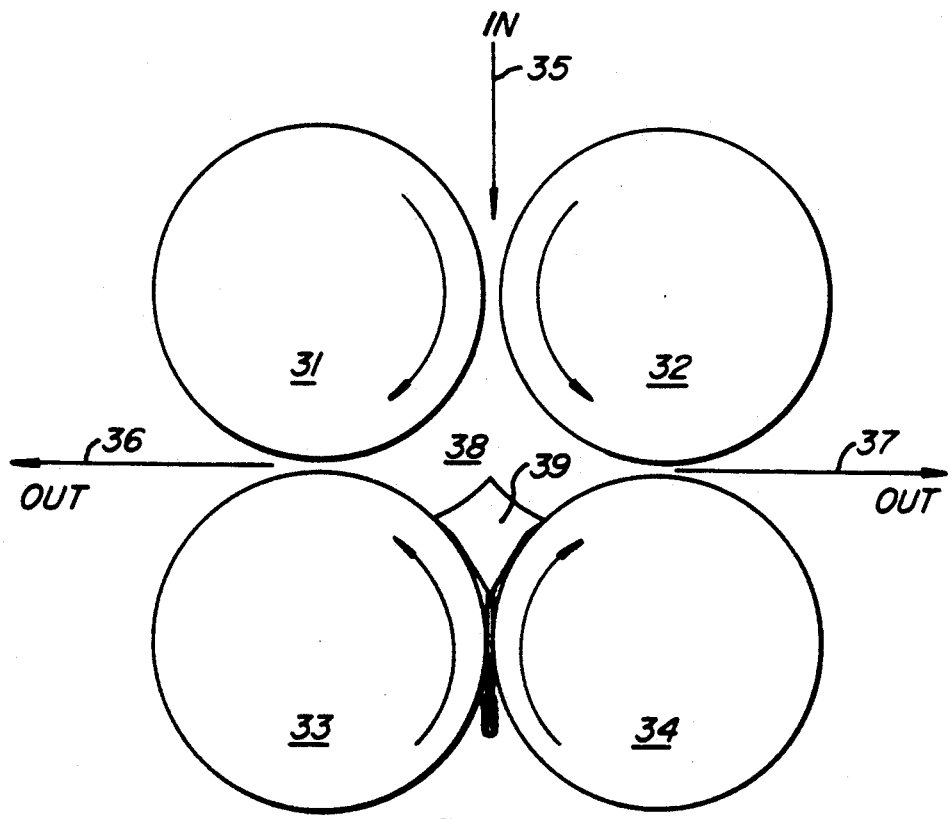
FIG. 3 shows a four roller sheet extruder.

FIGS. 1 and 2 show a three roller sheeter, but it is also possible to have a system of more than three rollers. For example, a four roller sheeter as shown in FIG. 3 will produce two thin sheets of farinaceous material simultaneously. In this configuration the rollers are arranged such that there are two rollers 31 and 32 positioned above two more rollers 33 and 34. All rollers rotate in the direction shown, and rollers directly adjacent each other rotate in opposite directions, while rollers diagonally opposite each other rotate in the same sense. The rotation is such that material will enter via the top gap between rollers, but be prevented from leaving through the bottom gap.

Raw material is allowed to enter via the top gap 35 and exits via gaps 36 and 37. By using this arrangement of rollers and by setting the gaps between the top roller sets 35 and the bottom to top rollers 36 and 37, it is possible to cause a back pressure to build up in the central region 38. To facilitate the setting of each gap the rollers 31 and 32 can be adjusted in or outwards from each other. Similarly, the gaps between rollers 31 and 33 and between 32 and 34 can be adjusted.

The gap between rollers 33 and 34 is fixed and can be set such that these rollers just touch each other, and because of their counter-rotating direction, this prevents any material in the central region 38 from flowing out between these two rollers. Or else, as shown in FIG. 3, a retaining wedge scraper 39 can be used. This wedge can also assist in controlling the material flow, by means of its shape.

The back pressure in the central region is further controlled by the gap adjustment mechanism controlling gaps 36 and 37, which is spring loaded or hydraulically or pneumatically controlled so that if the back pressure in the central region 38 increases above the set point the rollers 31 and 32 will move slightly away from the rollers 33 and 34 thus reducing the back pressure. Conversely, as the back pressure drops, the rollers described above again move closer together and the back pressure again increases. In this way the back pressure in the central region 38 is maintained at a level around a central set point. Heating or cooling of the rollers or the central retaining wedge can also be achieved as previously generally described for the three roll sheet extruder.

A further aspect of the present invention is that by using a three roll sheeter as shown in FIG. 1, together with the pre-sheeting mixing and agglomeration procedure, it is possible to continuously produce a thin sheet of starch containing material without gluten or the need for complicated steaming or heating of the materials or the use of gums or special binders as required in the prior art. By cutting and shaping pieces from sheets produced in this way and baking or frying these single layer pieces, flat snack products like fabricated potato or corn crisps or certain hollow or blistered products similar to those described in U.S. Pat. Nos. 4,873,093, 4,834,996, 4,752,493, and 3,384,496 can be produced. This can now be done without the restrictions or special choice of raw materials or the complications of the pre-sheeting processing described in these patents and in other prior art processes, and as a result less expensive equipment and production methods can be used.

PCT Patent Application PCT/AU88/00064 (WO88/06849) describes a method for producing hollow food products from two layers of farinaceous material. The present invention also concerns a method of producing such hollow laminar food products by utilizing the three or four roller sheet extruders described herein to make continuous uniform sheets of starch containing material, which are ideal for producing these hollow products.

The four roll configuration can produce two sheets simultaneously and this has an advantage over prior art production processes in which a single sheet of dough is produced and then must be cut into two sections and laminated one onto the other, or else a wider sheet must be folded partly onto itself to form a laminated sheet. Both these prior art methods are well known in, for example, the bakery industry, to produce pastries or crackers. Because the four roll sheet extruder in the present invention simultaneously produces two sheets of farinaceous material of the same width, it can produce a two layered product using rollers and conveyor systems at half the width of a single sheet extruder of the same output capacity. The present invention thus makes possible significant cost savings on equipment and requires less factory floor space.

Prior to this invention and PCT Application PCT/AU88/00064 the known methods for encapsulating one food inside another were the processes of injection, co-extrusion, encrusting, coating, or by making two sheets and then crimping them together with the encapsulated food positioned in between, as in ravioli production for example. The injection and co-extrusion processes will only work with liquids. Coating and encrusting do not produce laminar hollow foods within the scope of the present invention. The traditional method of making ravioli-type products involves making a sheet of dough which is not suitable for the production of puffed hollow food products; primarily being too thick and high in moisture content, and ravioli does not expand to form a hollow product when cooked by boiling. Ravioli and pasta dough also contain gluten.

The present invention can be utilized for making a puffed hollow food containing a solid, semi-solid or paste encapsulated in the central region. The introduced food, which can be, for example, a chocolate chip, a nut, dried fruit or vegetable, dried fish or meat, or else a paste or a dry flavouring or seasoning mixture or similar filling is positioned so that the two layers, as described in PCT/AU88/00064, are contiguous except where in contact with the introduced food piece, and are completely sealed around the peripheral edge. The introduced food item may be pre-coated or pre-cooked, if desired. The introduced material can also contain a leavening agent such that when heated during the cooking process it produces a gas such as carbon dioxide or ammonia which aids in the puffing process by forcing the layers apart to form the hollow centre. The shaped article is then cooked so as to produce a puffed hollow and shaped food article with the introduced food encapsulated inside. For example, if the introduced food is a nut, the expanded central void after cooking has a greater volume than the encapsulated nut which is then free to rattle within the food article, and this adds to the appeal of the snack, or similar food. A smaller hollow food article may also be positioned within a larger such article by this means.

The invention is now described with reference to certain examples, which are not limiting on the invention:

EXAMPLE 1

A three roller sheet extruding machine has a general configuration as shown in FIGS. 1 and 2 with roller diameters of 80 mm and width of 100 mm. It is equipped with a 0.37 kW electric motor and the rotational speed is nominally set at 25 rpm. The back pressure in the central region 18 is controlled by helical springs positioned at 20 and the mechanisms operate as described above.

EXAMPLE 2

A thin sheet of farinaceous material consisting of potato flakes, granules and starch is manufactured using the apparatus of Example 1.

| INGREDIENTS | Grams |
| --- | --- |
| Potato flakes | 150 |
| Potato granule | 120 |
| Potato starch | 30 |
| Salt | 8 |
| Water | 200 |

MIXING PROCEDURE

The ingredients are placed in a food processing machine of the type with high speed rotating cutting blades. The dry ingredients are first blended together and then the water is added and then mixed at high speed for 15 seconds. The mix is then allowed to stand for 5 minutes after which it is again mixed at high speed for a further 15 seconds. The resulting mixture is a moist particulate free flowing agglomerated material.

SHEETING

The foller gap settings are adjusted on the three roller sheeter such that the gap between the primary rollers is 0.4 mm and the gap between the secondary set is 0.2 mm. The spring tension at 20 is set to just counter-balance the upward forces on shaft 25 when operating with the farinaceous material being sheeted.

The moist agglomerated material is placed in the feed hopper mounted above the primary rollers of the prototype three roller sheeter and the material is passed through this machine to produce a continuous uniform sheet of farinaceous material of thickness in the range 0.7 to 1.5 mm depending on the precise adjustment of the machine and the quality of the raw material used.

EXAMPLE 3

A hollow snack product is produced as follows. A thin sheet of farinaceous material containing potato is produced according to the method described in Example 2. The sheet is then cut into square shaped pieces and fried in cooking oil at 180° C. for 2.5 minutes to give a pillow shaped product with a crisp crunchy texture and hollow centre.

EXAMPLE 4

A potato chip like product is produced as follows:

| INGREDIENTS | Grams |
| --- | --- |
| Pulped raw potato | 100 |
| Potato starch | 50 |
| Potato flake | 60 |
| Salt | 5 |
| Citric acid | 1 |

Fresh potato is pulped in the high speed mixer and the dry ingredients are added and an agglomerated material is prepared as in Example 2. A thin sheet of farinaceous material is produced according to Example 2. The sheet is cut and fried as in Example 3 to give a potato chip like product with a crisp and crunchy texture.

EXAMPLE 5

A nutritious pet food is made as follows:

| INGREDIENTS | Grams |
| --- | --- |
| Sugar flour | 60 |
| Soya grits | 45 |
| Potato starch | 90 |
| Potato granules | 45 |
| Salt | 6 |
| Water | 140 |

A sheet of material of thickness 0.9 mm is produced according to the method in Example 2.

Two sheets of material are placed contiguously and then cut to form a rectangular shaped piece with the peripheral edge completely sealed all the way around. The shaped pieces are baked in an oven at 260° C. for four minutes to give a hollow puffed dog food.

EXAMPLE 6

A corn chip type product is made as follows:

| INGREDIENTS | Grams |
| --- | --- |
| Massa flour | 135 |
| Potato flake | 90 |
| Salt | 6 |
| Water | 120 |

A thin sheet of farinaceous material is produced according to the method described in Example 2.

The sheet is then fried in cooking oil at 175° C. for 2.5 minutes to give a corn chip like product with a crisp crunchy texture.

EXAMPLE 7

A breakfast food type product is made as follows:

| INGREDIENTS | Grams |
| --- | --- |
| Wheat flour (heat treated) | 35 |
| Rye meal | 40 |
| Barley flour | 15 |
| Oatmeal | 15 |
| Wheatbran | 10 |
| Potato flake | 60 |
| Water | 120 |

A thin sheet of farinaceous material is produced according to the method described in Example 2.

Two sheets of material are placed contiguously and then cut to form a rectangular shaped piece with the peripheral edge completely sealed all the way around.

The shaped pieces are microwaved at 0.75 kW for 1.5 minutes followed by a further period of baking for 2 minutes. The puffed hollow product is coated with sorbitol and sugar to produce a breakfast food suitable to be consumed with milk similar to such things as Rice Bubbles.

EXAMPLE 8

A snack food with a nut encapsulated inside is produced. A thin sheet of farinaceous material is prepared according to the method in Example 2.

A sheet of the prepared material is placed flat and peanut pieces are placed at intervals of 30 mm along and across the sheet. A second layer of material is then placed over the first covering the nut pieces. The sheets are then cut in a rectangular shape around the nut pieces such that the peripheral edge is also completely sealed. The pieces containing the nut pieces are fried in cooking oil to form a puffed hollow snack food containing a nut piece encapsulated inside.

EXAMPLE 9

This example produces a hollow confectionary product:

|  | Grams |
| --- | --- |
| Wheat flour | 175 |
| Potato starch | 60 |
| Drinking chocolate | 45 |
| Wheatbran | 24 |
| Salt | 6 |
| Water | 150 |

A thin sheet of farinaceous material is produced according to the method described in Example 2.

A sheet of the prepared material is placed flat and globules of a mixture of shortening and baking powder containing sodium bicarbonate and acid pyrophosphate and water are placed at intervals of 30 mm along and across the sheet. A second layer is then placed over the first covering the globules so that the sheets are contiguous except where in contact with the enclosed globules. The sheets are cut in a circular shape around the globules such that the peripheral edge is also completely sealed. The pieces are baked in an oven at 270° C. for four minutes to give a hollow chocolate flavoured confectionary product.

EXAMPLE 10

A hollow biscuit type product is manufactured.

| INGREDIENTS | Grams |
| --- | --- |
| Self raising flour | 400 |
| Butter | 50 (?) |
| Sugar | 70 |
| Salt | 5 |
| Water | 80 (?) |

A thin sheet of farinaceous material is prepared according to the method in Example 2 and is formed and baked according to the method in Example 5 to give a hollow biscuit or cracker type product.

EXAMPLE 11

A four roller sheet extruder was constructed having roller diameters of 80 mm and widths of 100 mm which operates as schematically described in FIG. 3. This machine produces two continuous thin sheets of farinaceous material simultaneously with thicknesses in the range 0.1 to 3.0 mm depending on the formulation the actual gap setting and spring tensions.

EXAMPLE 12

A partly gelatinised sheet is made as follows:

| INGREDIENTS | Grams |
| --- | --- |
| Potato starch | 170 |
| Potato granule | 125 |
| Cornflour (degerm) | 30 |

| -continued | |
|---|---|
| INGREDIENTS | Grams |
| Water | 180 |

The rollers of the three roller sheet extruder according to FIG. 1 and Example 1 are heated by an external gas flame to a surface temperature of 200° C. and a thin sheet of material is produced according to Example 2. The composition of the sheet is such that it is semi-translucent and more cohesive due to partial gelatinisation of the starch.

EXAMPLE 13

An open shaped food shell suitable for various fillings or scooping savoury dips is produced.

A thin sheet of material is produced according to the ingredients and method described in Example 2.

Two sheets of prepared material are placed contiguously and cut to form a shaped food piece in the shape of a heart with the peripheral edge completely sealed all around.

The cut and shaped pieces are fried at 175° C. for 2.5 minutes to produce a hollow puffed food piece. The food piece is then separated by breaking the peripheral seal to form two half pieces which are cup or scoop like in shape and suitable for placing savoury or garnish pieces in or for scooping savoury dips or the like.

I claim:

1. Apparatus for producing a continuous thin sheet of farinaceous material of a thickness between 0.1 and 3 mm from a farinaceous dough, comprising:
   a top substantially horizontal pair of rollers;
   either an additional roller located centrally beneath said top rollers, or an additional pair of rollers located directly beneath said top rollers, the three or four rollers defining a central region for receiving the dough;
   said rollers rotating such that dough enters a gap between the two top rollers and exits a gap between a top roller and the bottom roller in the case of one bottom roller, or exits two gaps between both adjacent top and bottom rollers in the case of two bottom rollers, other openings between said rollers to the central region being effectively sealed;
   means for selectively adjusting the gaps between adjacent rollers to maintain positive hydrostatic pressure in the central region between the rollers; and
   wherein said pressure is maintained and regulated by altering said gap between two rollers through which a sheet exits, by means of a spring, or hydraulic or pneumatic device, such that if said pressure increases above a preset value the rollers move apart, or if said pressure falls below another preset value the rollers move closer together.

2. The apparatus of claim 1 which has three rollers, and wherein the gap between the top and bottom roller through which the thin sheet does not exit is sealed with a wedge, and the ends of the central region being sealed by side plates or rotating discs.

3. The apparatus of claim 1 which has four rollers, and wherein the gap between the two bottom rollers is sealed with a wedge, and the ends of the central region being sealed by side plates or rotating discs.

4. The apparatus of claim 1 wherein the rollers further comprise means for heating or cooling.

5. The apparatus of claim 1 further comprising means for injecting steam into said central region.

6. The apparatus of claim 2 further comprising means for controlling the hydrostatic pressure by selectively adjusting the speed at which said rollers rotate such that if the hydrostatic pressure increases above the preset value the top roller which is not adjacent the exit is slowed relative to the other rollers, or if the hydrostatic pressure decreases, said top roller is speeded up.

7. The apparatus of claim 2 wherein the axis of the top roller adjacent the exit is movably mounted on an arm, one end of which is connected to the axis of the bottom roller, allowing the gap between the rollers to be adjusted, said arm also being pivotable around the lower roller axis, thereby allowing the gap between the two top rollers to be adjusted.

8. A method of producing a continuous thin sheet of farinaceous material of a thickness of between 0.1 and 3 mm from a farinaceous dough, comprising the steps of:
   providing an apparatus comprising, closely juxtaposed, a top substantially horizontal pair of rollers, and either an additional roller located centrally beneath said top rollers, or an additional pair of rollers located directly beneath said top rollers, the three or four rollers defining a central region for receiving the dough;
   rotating said rollers such that dough enters a gap between the two top rollers and exits a gap between a top roller and the bottom roller in the case of one bottom roller, or exits two gaps between both adjacent top and bottom rollers in the case of two bottom rollers, other openings between said rollers to the central region being effectively sealed;
   selectively adjusting the gaps between adjacent rollers to maintain positive hydrostatic pressure in the central region between the rollers, and wherein said pressure is maintained and regulated by altering said gap between two rollers through which a sheet exits, by means of a spring, or hydraulic or pneumatic device, such that if said pressure increases above a preset value the rollers move apart, or if said pressure falls below another preset value the rollers move closer together;
   feeding the dough into the central region via the gap between the top rotating rollers; and
   producing a thin sheet of farinaceous material through the gap between one or two bottom rollers and the adjacent top rollers, while maintaining the positive hydrostatic pressure within said central region.

9. The method of claim 8 wherein the farinaceous dough is a free flowing moist agglomerate having a total moisture content below the level where the material forms a cohesive dough mass before entering the rollers, characterised in that said agglomerate is produced by means of high speed chopping blades during a mixing and hydrating process.

10. The method of claim 8 wherein the dough is substantially free of gluten, gums, modified starches, or other binders.

11. The method of claim 10 wherein the dough consists of potato starch, flakes or granules.

12. A method of claim 10 wherein the dough is made from a starch containing material selected from the group consisting of corn starch, corn massa, rice flour, wheat starch, and mixtures thereof.

13. The method of claim 8 wherein the rollers are heated, thereby heating the dough as it is processed through the rollers.

14. The method of claim 8 wherein the rollers are cooled, thereby cooling the dough as it is processed through the rollers.

15. The method of claim 8 wherein steam is injected into the central region.

16. The method of claim 8 wherein the farinaceous material is super heated under pressure within the central region.

17. The method of claim 8 wherein the farinaceous material is heated so as to at least partly gelatinise the farinaceous material.

18. A method of making a baked or fried product from a farinaceous dough, comprising the steps of:
   providing an apparatus comprising, closely juxtaposed, a top substantially horizontal pair of rollers, and either an additional roller located centrally beneath said top rollers, or an additional pair of rollers located directly beneath said top rollers, the three or four rollers defining a central region for receiving the dough;
   rotating said rollers such that dough enters a gap between the two top rollers and exits a gap between a top roller and the bottom roller in the case of one bottom roller, or exits two gaps between both adjacent top and bottom rollers in the case of two bottom rollers, other openings between said rollers to the central region being effectively sealed;
   selectively adjusting the gaps between adjacent rollers to maintain positive hydrostatic pressure in the central region between the rollers, and wherein said pressure is maintained and regulated by altering said gap between two rollers through which a sheet exits, by means of a spring, or hydraulic or pneumatic device, such that if said pressure increases above a preset value the rollers move apart, or if said pressure falls below another preset value the rollers move closer together;
   feeding the dough into the central region via the gap between the top rotating rollers;
   producing a continuous thin sheet of farinaceous material of a thickness of between 0.1 and 3 mm through the gap between one or two bottom rollers and the adjacent top rollers, while maintaining the positive hydrostatic pressure within said central region; and
   cutting said sheet to obtain individual shaped pieces, and baking or frying said pieces to obtain a baked or fried product.

19. The method according to claim 18 wherein the cut and shaped pieces are dried, and optionally stored, before being baked or fried.

20. The method of claim 17, further comprising the steps of:
   cutting said sheet to obtain individual shaped pieces; and
   baking or frying said pieces to obtain a baked or fried product.

21. The method according to claim 20 wherein the cut and shaped pieces are dried, and optionally stored, before being baked or fried.

22. A method for making a hollow three dimensional food product from a farinaceous dough, the method comprising the steps of:
   providing an apparatus comprising, closely juxtaposed, a top substantially horizontal pair of rollers, and either an additional roller located centrally beneath said top rollers, or an additional pair of rollers located directly beneath said top rollers, the three or four rollers defining a central region for receiving the dough;
   rotating said rollers such that dough enters a gap between the two top rollers and exits a gap between a top roller and the bottom roller in the case of one bottom roller, or exits two gaps between both adjacent top and bottom rollers in the case of two bottom rollers, other openings between said rollers to the central region being effectively sealed;
   selectively adjusting the gaps between adjacent rollers to maintain positive hydrostatic pressure in the central region between the rollers;
   maintaining and regulating said pressure by altering said gap between two rollers through which a sheet exits, by means of a spring, or hydraulic or pneumatic device, such that if said pressure increases above a preset value the rollers move apart, or if said pressure falls below another preset value the rollers move closer together;
   feeding the dough into the central region via the gap between the top rotating rollers;
   producing a continuous thin sheet of farinaceous material of a thickness of between 0.1 and 3 mm through the gap between one or two bottom rollers and the adjacent top rollers, while maintaining the positive hydrostatic pressure within said central region;
   positioning two sheets of said material contiguously to form a layered material;
   cutting the layered material to obtain shaped pieces with the peripheral edges of the shaped pieces completely sealed all around; and
   baking or frying said shaped pieces such that steam generated within the shaped pieces causes the pieces to expand and form a hollow three dimensional food product.

23. The method of claim 22, wherein two thin sheets are produced simultaneously by a four roller apparatus.

24. The method of claim 22, further comprising the step of:
   positioning at least one discreet food article between the two sheets of said layered material such that the sheets are cut around the article and completely sealed around the peripheral edges thereof; and
   wherein said baking or frying causes the layers to form a hollow completely enclosed food article, with the discrete food article encapsulated within.

* * * * *